(12) United States Patent
Nakahara et al.

(10) Patent No.: US 6,473,147 B1
(45) Date of Patent: Oct. 29, 2002

(54) LIQUID CRYSTAL DEVICE, METHOD FOR MANUFACTURING THE LIQUID CRYSTAL DEVICE, AND ELECTRONIC APPARATUS

(75) Inventors: Hiroki Nakahara, Nagano; Hideaki Okumura, Yamagata-mura; Takeshi Nakamura, Misato-mura, all of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/424,433
(22) PCT Filed: Mar. 31, 1999
(86) PCT No.: PCT/JP99/01707
§ 371 (c)(1),
(2), (4) Date: Nov. 23, 1999
(87) PCT Pub. No.: WO99/52011
PCT Pub. Date: Oct. 14, 1999

(30) Foreign Application Priority Data

Apr. 1, 1998 (JP) .......................................... 10-089025

(51) Int. Cl.[7] ...................... G02F 1/1339; G02F 1/1345
(52) U.S. Cl. ......................... 349/153; 349/149; 349/190
(58) Field of Search .......................... 349/153, 40, 139, 349/149, 152, 187, 190; 430/20

(56) References Cited

U.S. PATENT DOCUMENTS

| 4,600,273 A | * | 7/1986 | Ohno | 349/40 |
| 5,818,562 A | | 10/1998 | Yoon | 349/149 |
| 5,841,414 A | | 11/1998 | Tanaka | 345/87 |
| 6,108,057 A | * | 8/2000 | Kusanagi | 349/40 |

FOREIGN PATENT DOCUMENTS

| JP | 57-191619 | 11/1982 |
| JP | 59-38423 | 3/1984 |
| JP | 4-324825 | 11/1992 |

* cited by examiner

Primary Examiner—William L. Sikes
Assistant Examiner—Viet B. Nguyen
(74) Attorney, Agent, or Firm—Harness, Dickey & Pierce, P.L.C.

(57) ABSTRACT

Regarding a liquid crystal device having a structure in which electrodes formed on a pair of substrates are subjected to conductive connection using a conductive member, the outer dimensions can be reduced despite the use of the conductive member, and a complicated pattern design including cross wiring and the like can be employed for the electrode patterns formed on the pair of substrates. A liquid crystal device is formed by joining a first substrate 2a comprising first electrodes 7a and external joining elements 8 and a second substrate 2b comprising second electrodes 7b by an annular sealing member 3. The sealing member 3 includes a conductive section 3b having the function of conductive connection and a non-conductive section 3a having no function of conductive connection, and the second electrodes 7b on the second substrate 2b are individually subjected to conductive connection to the terminals 8 on the first substrate 2a via the conductive section 3b of the sealing member 3. The non-conductive section 3a does not have the function of conductive connection, so that the first electrodes 7a and the second electrodes 7b can be subjected to cross wiring at that section.

13 Claims, 11 Drawing Sheets

LIQUID CRYSTAL DEVICE, METHOD FOR MANUFACTURING THE LIQUID CRYSTAL DEVICE, AND ELECTRONIC APPARATUS

TECHNICAL FIELD

The present invention relates to a liquid crystal device including a pair of substrates and liquid crystal sealed in a space between the substrates, and to a method for manufacturing the same. The present invention also relates to an electronic apparatus composed of the liquid crystal device.

BACKGROUND ART

Recently, liquid crystal devices have been widely used in various types of electronic apparatuses, such as mobile phones and portable information terminal units. In many cases, the liquid crystal devices are used to display visible information, such as letters and numeric characters.

As a conventional liquid crystal device, a liquid crystal device such as that shown in FIG. 12 has been known. The liquid crystal device is formed by joining a first substrate 51a and a second substrate 51b by means of an annular sealing member 52. A plurality of linear first electrodes 53a are formed on the inner surface of the first substrate 51a, and a plurality of external terminals 54 are formed on a section of the first substrate 51a protruding to the outside of the second substrate 51b. The first electrodes 53a are individually jointed to the external terminals 54. In addition, a plurality of linear second electrodes 53b opposing the first electrodes 53a in an orthogonal state are formed on the inner surface of the second substrate 51b opposing the first substrate 51a.

In an actual liquid crystal device, a great number of first electrodes 53a, second electrodes 53b and external terminals 54 are formed on the substrate 51a or 51b. In FIG. 12, however, several of them are shown in order to make the structure understandable.

The sealing member 52 serves as an anisotropic conductive member by mixing a plurality of conductive particles into an adhesive agent. The second electrodes 53b on the second substrate 51b are routed to a section of the sealing member 52 where the external terminals 54 are located, and are subjected to conductive connection to the external terminals by the conductive particles included in the sealing member 52. According to the conventional liquid crystal device, however, the conductive particles are mixed into the whole area of the sealing member 52 and therefore, routing lines extending from the first electrodes 53a and routing lines extending from the second electrodes 53b cannot be subjected to cross wiring or wiring in such a manner that they linearly overlap (hereinafter, referred to as cross wiring and the like) within an area where the sealing member 52 exists. Consequently, there is a problem in that pattern design of a wiring pattern is greatly limited by the existence of the sealing member 52.

A liquid crystal device having a structure shown in FIG. 13 is also known as a conventional liquid crystal device. According to the conventional liquid crystal device shown therein, a sealing member 62 is formed of an insulating adhesive agent, and conductive members 61 are provided at the area that is both outside the sealing member 62 and between the first substrate 51a and the second substrate 51b. Routing lines extend from the second electrodes 53b on the second substrate 51b across the sealing member 62 and extend to the conductive members 61 and are individually subjected to conductive connection to the external terminals 54 on the first substrate 51a.

According to this conventional device, since the sealing member 62 does not have conductivity, the routing lines of the first electrodes 53a and the routing lines of the second electrodes 53b can be subjected to cross wiring and the like within an area of the sealing member 62. Therefore, this conventional device provides the advantage that the versatility of possible pattern design increases. According to this conventional device, however, since the conductive members 61 should be formed outside the sealing member 62, there is a problem in that a useless space which is formed around an effective display area of the liquid crystal device and which does not contribute to display, a so-called frame area or parting area, becomes enlarged.

The present invention has been achieved in consideration of the above-described problems of the conventional liquid crystal devices, and an object is to enable outer dimensions, particularly the size of a so-called parting area around an effective display area to be reduced despite the use of a conductive member regarding a liquid crystal device of a type in which electrodes formed on one substrate are subjected to conductive connection to external terminals formed on the other substrate using conductive members, and to enable a complicated pattern design including cross wiring and the like regarding electrode patterns formed on a pair of substrates.

SUMMARY OF THE INVENTION (1) In order to achieve the above object, according to the present invention, there is provided a liquid crystal device comprising a first substrate having a plurality of first electrodes and a plurality of external terminals; a second substrate having a plurality of second electrodes opposing the first electrodes; and an annular sealing member for joining the first substrate and the second substrate to each other, wherein the sealing member includes a conductive section having the function of conductive connection and a non-conductive section having no function of conductive connection, and wherein the plurality of second electrodes on the second substrate are individually subjected to conductive connection to the plurality of external terminals on the first substrate via the conductive section of the sealing member.

According to this liquid crystal device, the sealing member is divided into two sections: the conductive section and the non-conductive section, and the second electrodes on the second substrate and the external terminals on the first substrate are subjected to conductive connection to each other by the conductive section. Therefore, the necessity for preparing a special conductive member in addition to the sealing member is eliminated, and consequently, the outer dimensions of the liquid crystal device can be reduced. In particular, the so-called parting area of the liquid crystal can be reduced. In addition, since the section of the sealing member other than the conductive section is the non-conductive section, a complicated electrode pattern including cross wiring and the like can be formed over a wide region of the liquid crystal device.

(2) Next, a method for manufacturing a liquid crystal device according to the present invention is a method for manufacturing a liquid crystal device comprising a first substrate having a plurality of first electrodes and a plurality of external terminals; a second substrate having a plurality of second electrodes opposing the first electrodes; and an annular sealing member for joining the first substrate and the second substrate to each other. This manufacturing method is characterized in that ① a conductive section of the sealing member is formed on one of the first substrate and the second substrate, that ② a non-conductive section of the sealing member is formed on the other one of the first substrate and the second substrate, and that ③ the first substrate and the second substrate are secured to each other in such a manner that the conductive section and the non-conductive section are jointed to form the annular sealing member.

If the manufacturing method is used, the liquid crystal of the above (1) can be reliably manufactured without undergoing a specially complicated process.

(3) Regarding the manufacturing method of the above (2), the conductive section of the sealing member may be provided in a state of being jointed to the plurality of external terminals on the first substrate or to the plurality of second electrodes on the second substrate. According to this method, an operation for forming the conductive member of the sealing member on one of the substrates can be executed very simply.

(4) Regarding the manufacturing method of the above (2), the conductive section of the sealing member is provided in a dotted state in correspondence with each of the plurality of external terminals formed on the first substrate or in correspondence with each of the plurality of second electrodes formed on the second substrate.

If the conductive section of the sealing member is provided in a state of being jointed to a plurality of electrodes as described in the above (3), the operation for forming the conductive section is simplified. On the other hand, however, a clot of the conductive section, for example, a clot of conductive particles may be generated between adjacent electrodes, resulting in a short circuit between the electrodes or the like and incapability of a normal pixel control.

In contrast, if the conductive section of the sealing member is formed in a dotted state, i.e., individually in correspondence with each of the electrodes or the like as in this embodiment, the clot of the conductive particles is not generated between the electrodes or the like and therefore, the short circuit can be reliably prevented from being caused between the electrodes or the like.

According to this embodiment, a sealed gap, a so-called cell gap must be formed by the sealing member between a pair of substrates for sealing liquid crystal. Thus, even if the conductive section of the sealing member is initially formed in a dotted state, the dotted section must be jointed to each other so as to exhibit a sealing action after a pair of substrates have been secured to each other. Accordingly, the size of the dot of the conductive section is set to a sufficient size for effectuating such a sealing action.

(5) According to the present invention, there is provided an electronic apparatus comprising a liquid crystal device including a pair of substrates; and liquid crystal sealed in a space between the substrates, wherein the liquid crystal device is the liquid crystal device as described in the above (1). As the electronic apparatus, for example, a mobile phone, a portable information terminal unit, or other various types of electronic apparatuses may be considered.

BEST MODE FOR CARRYING OUT THE INVENTION (First Embodiment)

Figure 4:
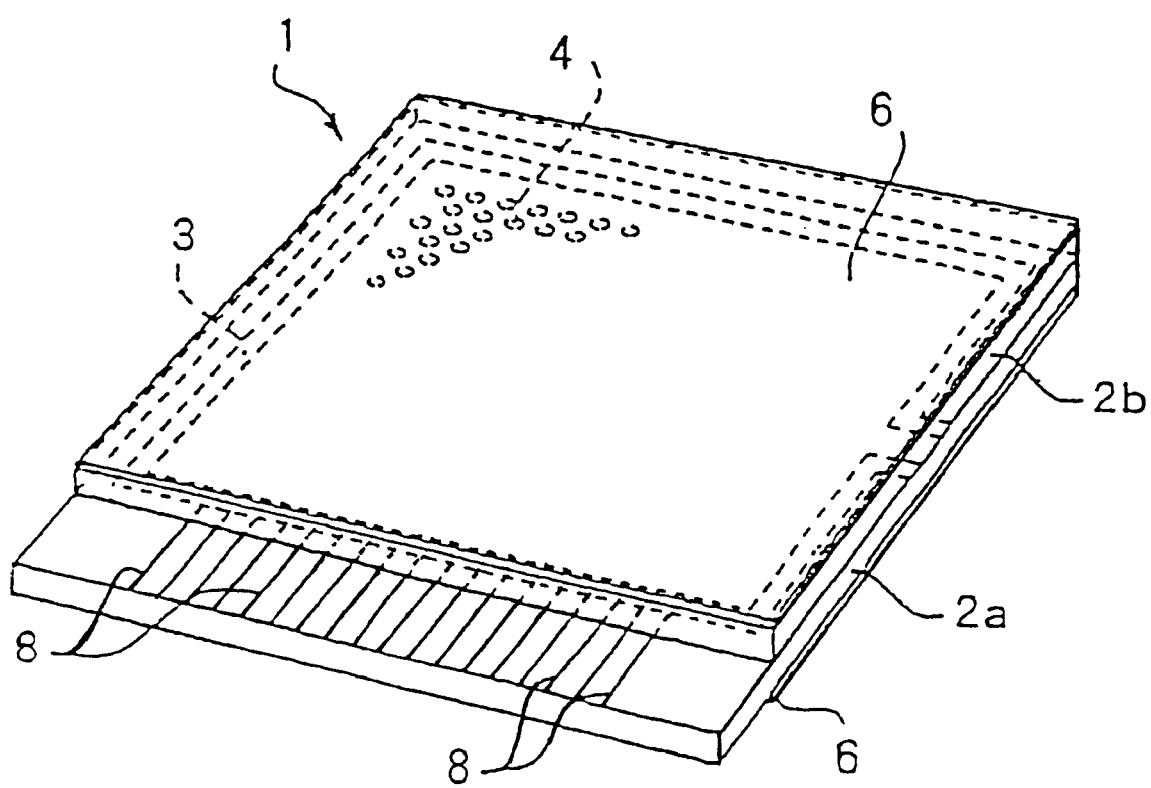
FIG. 4 is a perspective view showing an external shape of the liquid crystal device shown in FIG. 1.

FIG. 4 shows an embodiment of a liquid crystal device according to the present invention. A liquid crystal device 1 includes a first substrate 2a, a second substrate 2b, and an annular sealing member 3 for joining the substrates to each other. The first substrate 2a and the second substrate 2b are formed of a light-transmissive material, such as glass or plastic.

A fine gap, so-called cell gap, is formed between the first substrate 2a and the second substrate 2b, and liquid crystal 4 is sealed in the cell gap. Polarizers 6 and 6 are secured to the outer surfaces of the first substrate 2a and the second substrate 2b.

Figure 1:
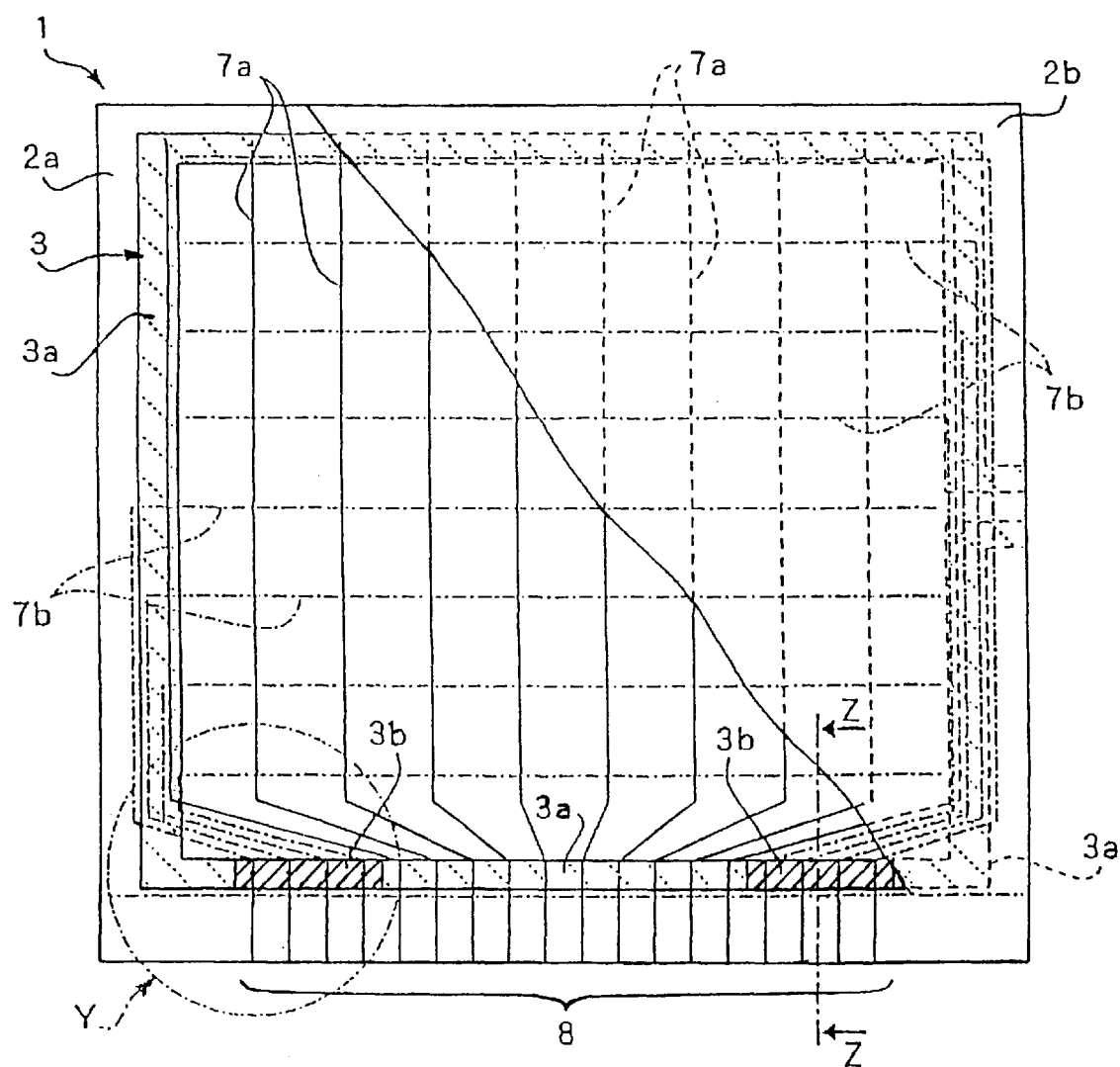
FIG. 1 is a partially cutaway plan view showing an embodiment of a liquid crystal device according to the present invention.

A plurality of linear first electrodes 7a are formed in parallel with each other on the inner surface of the first substrate 2a, as shown in FIG. 1. A plurality of external terminals 8 are formed in parallel with each other on a section of the first substrate 2a protruding to the outside of the opposing second substrate 2b. These external terminals 8 are used for the establishment of an electric connection between the liquid crystal device 1 and an external circuit for driving the liquid crystal device 1. A plurality of linear second electrodes 7b are formed in parallel with each other so as to be orthogonal to the first electrodes 7a on the inner surface of the second substrate 2b opposing the first substrate 2a.

In an actual liquid crystal device, a great number of first electrodes 7a, second electrodes 7b, and external terminals 8 are formed on the substrate 2a or the substrate 2b. In the drawings, however, all of them are not shown, but several of them are shown in order to make the structure of the device understandable.

The sealing member 3 for joining the first substrate 2a and the second substrate 2b is formed annularly by the two conductive sections 3b, which are provided correspondingly to a protruding section of the first substrate 2a and are jointed to a non-conductive section 3a, which occupies the area other than the conductive sections, without any clearance therebetween. The conductive section 3b is formed of an anisotropic adhesive agent that exhibits conductivity only in a specific direction, and the non-conductive section 3a is formed of an adhesive agent having no conductivity. The anisotropic adhesive agent can be formed by, for example, as shown in FIG. 3, mixing a plurality of conductive particles 11 into an electrically insulating adhesive agent 9 in a dispersed state.

Referring to FIG. 1, the first electrodes 7a are formed on the first substrate 2a across the non-conductive section 3a of the sealing member 3, and are individually jointed to the external terminals 8, which are similarly formed on the first substrate 2a. On the other hand, the second electrodes 7b formed on the second substrate 7b reach the conductive sections 3b of the sealing member 3 after being routed on the second substrate 2b. The second electrodes 7b that have reached the conductive sections 3b are electrically jointed to the external terminals 8 on the first substrate 2a via the conductive particles 11, as shown in FIG. 3.

Figure 3:
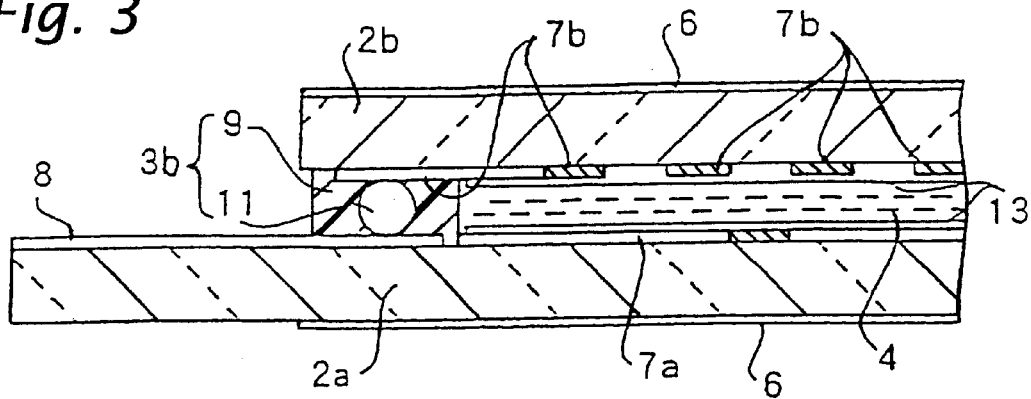
FIG. 3 is a sectional view taken along the line Z—Z in FIG. 1.

Referring to FIG. 3, reference numeral 13 denotes alignment films formed on the overall inner surfaces of the first substrate 2a and the second substrate 2b while overlapping the first electrodes 7a or the second electrodes 7b. Uniaxial alignment treatment, such as rubbing treatment, is applied to these alignment films.

By constructing the liquid crystal device 1 as described above, if the external circuit is jointed to the external terminals 8 using wiring members, such as an FPC (Flexible Printed Circuit) and a TCP (Tape Carrier Package), and either of the first electrodes 7a or the second electrodes 7b are selected based on a command from the external circuit to apply a predetermined ON voltage or OFF voltage therebetween, the orientation of the liquid crystal that is contained in pixels which are formed by crossing of the electrodes 7a and 7b can be controlled.

According to the liquid crystal device of this embodiment, the sealing member 3 consists of two sections: the conductive section 3b and the non-conductive section 3a, and the second electrodes 7b on the second substrate 2b and the external terminals 8 on the first substrate 2a are subjected to conductive connection to each other by the conductive section 3b. Accordingly, the necessity for preparing a special conductive member in addition to the sealing member 3 is eliminated, and the outer dimensions of the liquid crystal device 1 can be reduced by the amount of the unused conductive member.

In particular, a conductive material used in a conventional liquid crystal device is generally disposed outside the sealing member 3. In this case, it may be considered that an area which is formed around an effective display area of the liquid crystal device 1 and which does not contribute to display becomes enlarged, so that the outer dimensions of the liquid crystal device 1 increase uselessly. On the contrary, according to this embodiment, since there is no need to provide a special conductive member outside the sealing member 3, the outer dimensions of the liquid crystal device 1 can be reduced.

Figure 2:
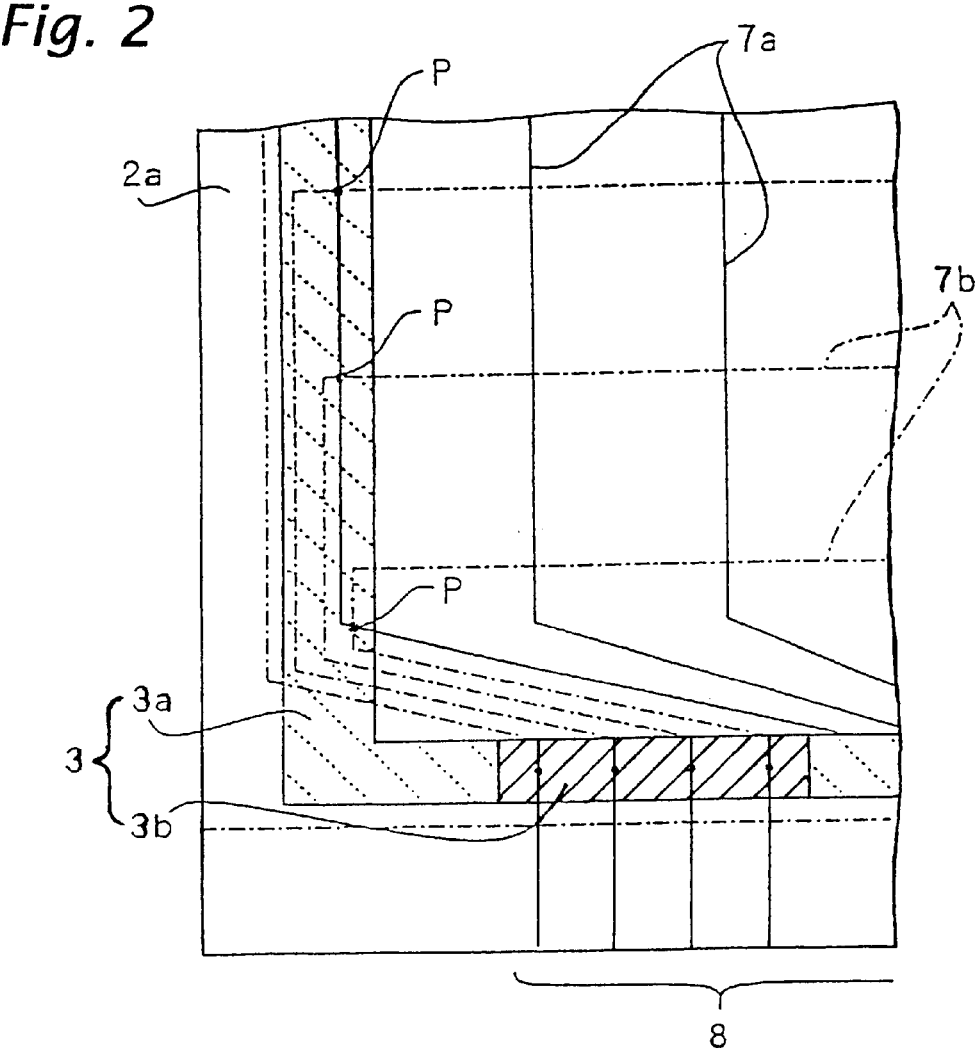
FIG. 2 is an enlarged view of a section shown in the direction of the arrow Y in FIG. 1.

In addition, according to this embodiment, the section of the sealing member 3 other than the conductive section 3b is the non-conductive section 3a. Thus, even if, as shown in FIG. 2, so-called cross wiring P is generated at sections where routing patterns of the first electrodes 7a intersect routing patterns of the second electrodes 7b, inconveniences, such as a short circuit, do not occur so long as the region where the cross wiring P exists is located to overlap the non-conductive section 3a of the sealing member 3. According to this embodiment, a wide section in the sealing member 3 is formed by the non-conductive section 3a, so that a complicated electrode pattern including cross wiring and the like can be formed over a wide region inside the liquid crystal device 1.

Figure 6:
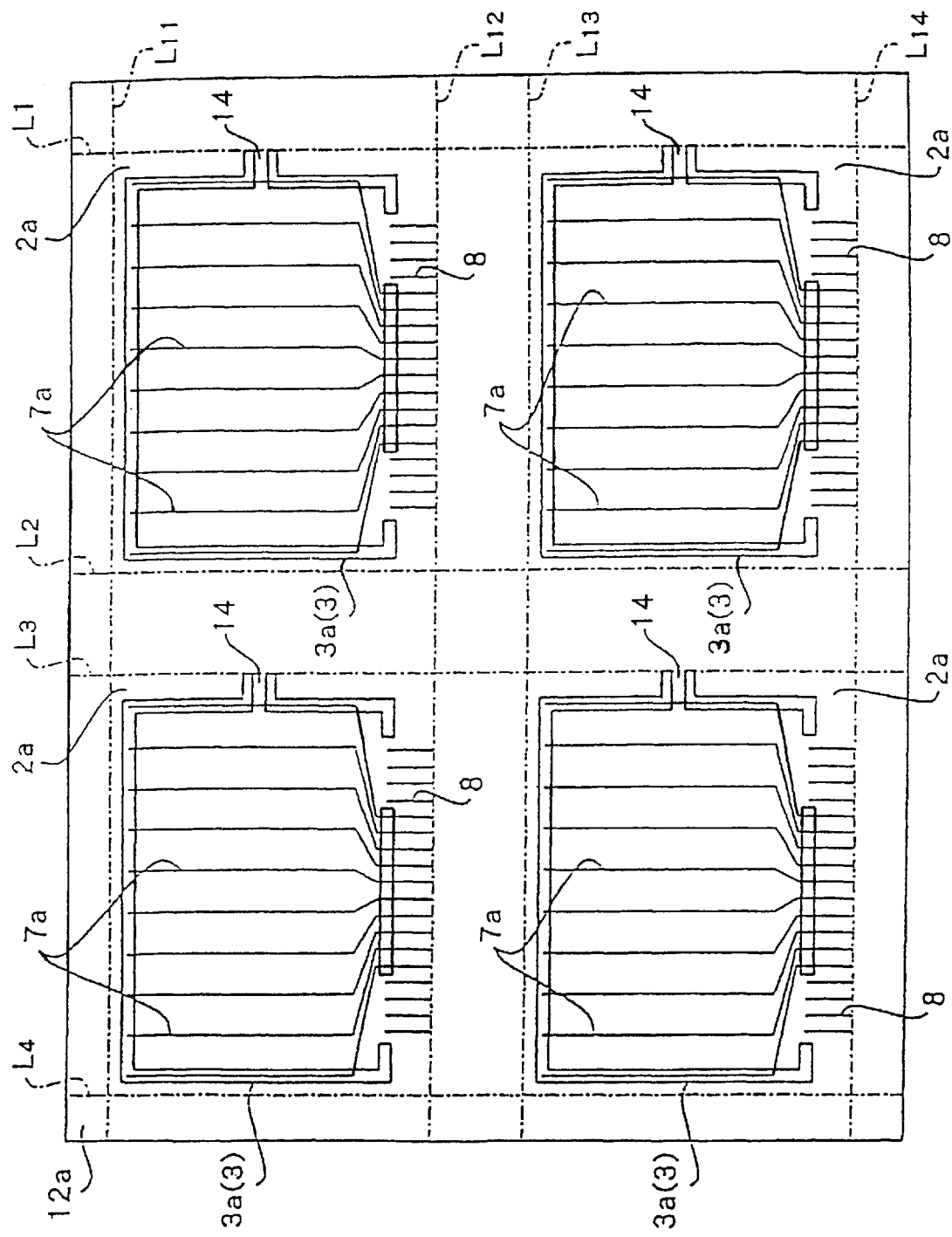
FIG. 6 is a plan view showing a substrate base material prepared in a halfway step of the manufacturing method of FIG. 5.

A description will now be given of an embodiment of a method for manufacturing the liquid crystal device 1 constructed as described above. First, as shown in FIG. 6, a first substrate base material 12a of a size including the first substrates 2a for a plurality of, four in this embodiment, liquid crystal devices is prepared. In addition, as shown in FIG. 7, a second substrate base material 12b of a size including the second substrates 2b for the same number of (that is, four) liquid crystal devices is prepared.

Figure 5:
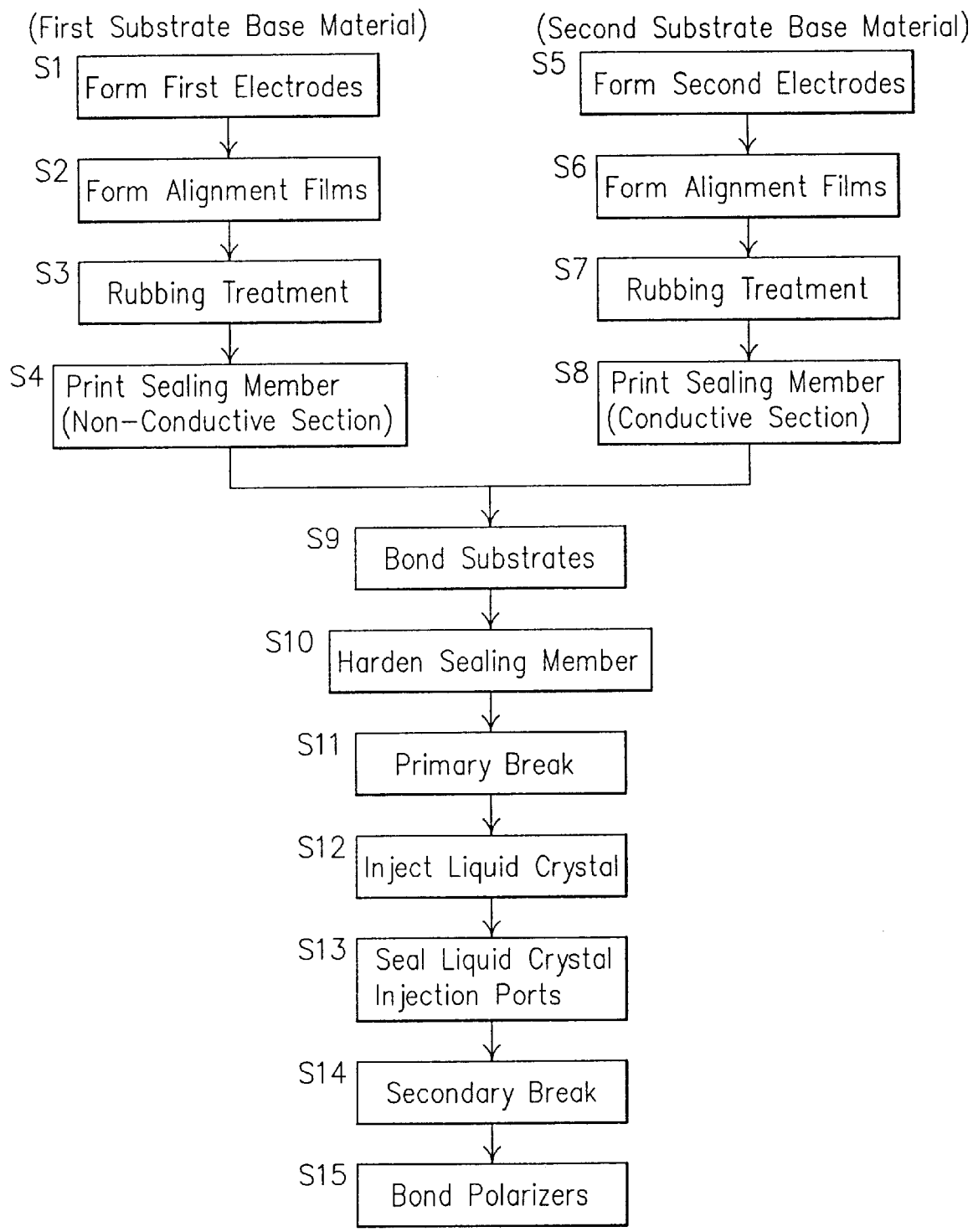
FIG. 5 is a process chart showing an embodiment of a manufacturing method for a liquid crystal device according to the present invention.

Next, the first electrodes 7a and the external terminals 8 for four liquid crystal devices are formed on the surface of the first substrate base material 12a (see FIG. 6) in step S1 of FIG. 5, alignment films are formed on the first electrodes 7a to cover the entire sections of the respective liquid crystal devices with a uniform thickness (step S2), and then rubbing treatment is applied to the alignment films (step S3).

Then, the non-conductive section 3a of the sealing member 3 is formed by printing or the like (step S4). In this case, the sections corresponding to the conductive sections 3b (see FIG. 1) are left blank without printing anything thereon. Numerals 14 in FIG. 6 denote liquid crystal injection ports for injecting liquid crystal.

Figure 7:
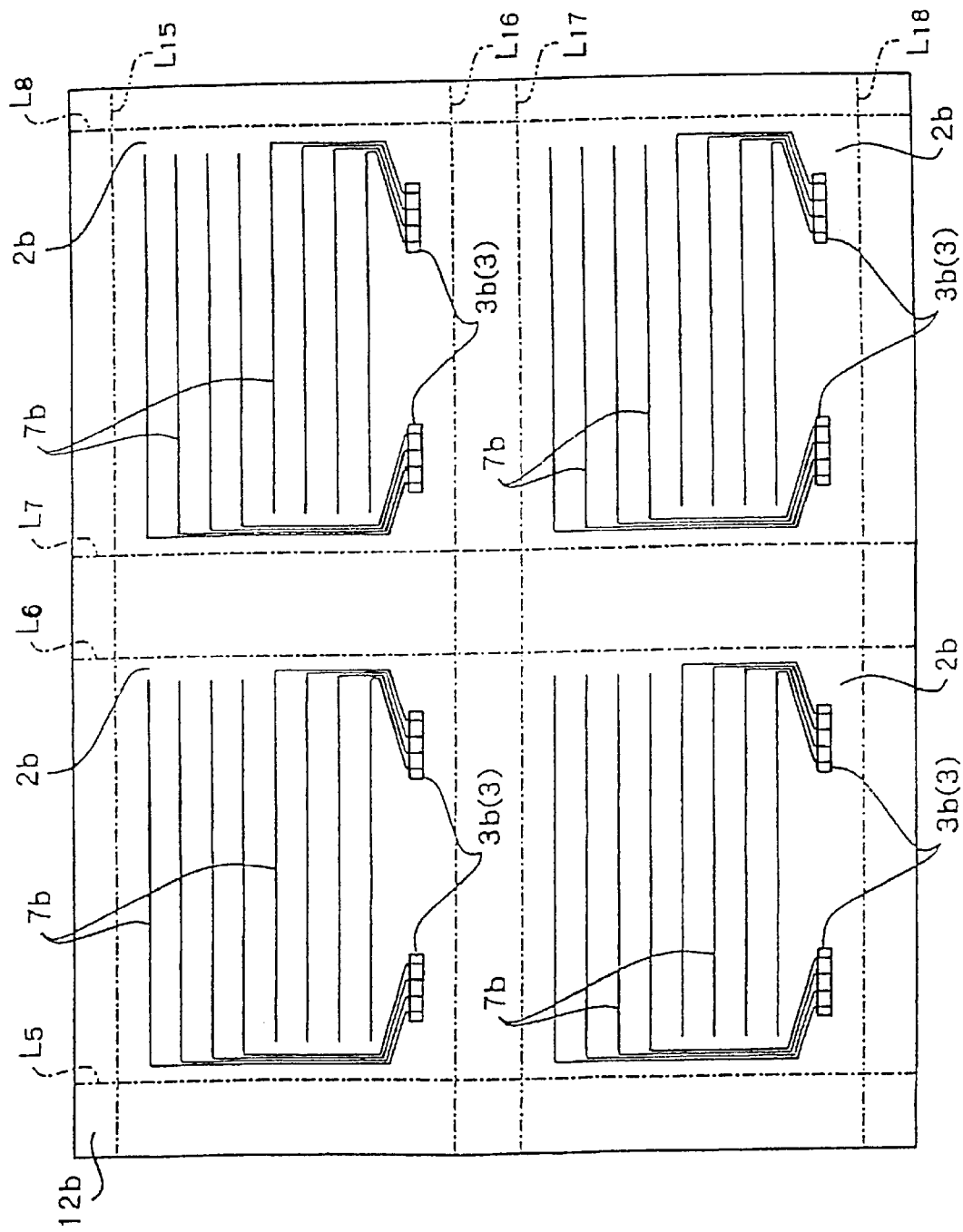
FIG. 7 is a plan view showing a substrate base material prepared in another halfway step of the manufacturing method of FIG. 5.

While predetermined treatments are applied to the first substrate base material 12a as described above, the following treatments are executed onto the second substrate base material 12b shown in FIG. 7. That is, the second electrodes 7b for four liquid crystal devices are formed on the surface of the second substrate base material 12b in step S5 of FIG. 5, alignment films are formed on the second electrodes 7b to cover the entire sections of the respective liquid crystal devices with a uniform thickness (step S6), and then rubbing treatment is applied to the alignment films (step S7).

Then, the conductive sections 3b (see FIG. 1) of the sealing member 3 are formed by printing or the like (step S8). In this case, the section corresponding to the non-conductive section 3a (see FIG. 1) is left blank without printing anything thereon.

After predetermined treatments have been applied to the first substrate base material 12a and the second substrate base material 12b as described above, both of the substrate base materials are secured in step S9. In this case, both of the substrate base materials 12a and 12b are secured to each other in such a manner that the non-conductive section 3a and the conductive section 3b of the sealing member 3 are closely joined to each other without forming any clearance therebetween.

Thereafter, the sealing member 3 is hardened in step 10. If the sealing member 3 is of a thermosetting type, the sealing member 3 is hardened by heating. If the sealing member 3 is of an ultraviolet-hardening type, the sealing member 3 is hardened by ultraviolet irradiation. Both of the substrate base materials 12a and 12b are tightly secured by the hardening of the sealing member 3, and the sealing member 3 is formed annularly without any clearance. By the above procedures, a panel frame of a large area including panel structures for a plurality of liquid crystal devices is formed.

Next, a primary break is executed in step S11. That is, cutting grooves, so-called scribe grooves are formed in the large area panel frame formed as described above at positions shown by numerals L1 to L8 in FIGS. 6 and 7, and the substrate base materials 12a and 12b are hit or pressed, whereby the large area panel frame is cut out at the scribe grooves. By the primary break procedure, panel frames of a middle area size are formed in a state where the liquid crystal injection ports 14 (see FIG. 6) of the sealing member 3 are exposed to the outside, that is, so-called strip panel frames.

Thereafter, liquid crystal is injected inside each of the liquid crystal devices via the externally exposed liquid crystal injection ports 14 (step S12), and the liquid crystal injection ports 14 are sealed by a resin after the completion of the injection (step 13). Then, a secondary break is executed in step S14. That is, scribe grooves are formed at positions shown by numerals L11 to L18 in FIGS. 6 and 7, and the middle area size panel frames are cut out from the positions of the scribe grooves.

By the above procedures, a liquid crystal panel corresponding to one liquid crystal device is created, and by bonding polarizers onto both sides of the liquid crystal panel (step S15), the single liquid crystal device 1 shown in FIG. 4 is completed. According to the above manufacturing method, the conductive section 3b and the non-conductive section 3a can be partially formed in the single annular sealing member 3 and joined to each other.

(Second Embodiment)

Figure 8:
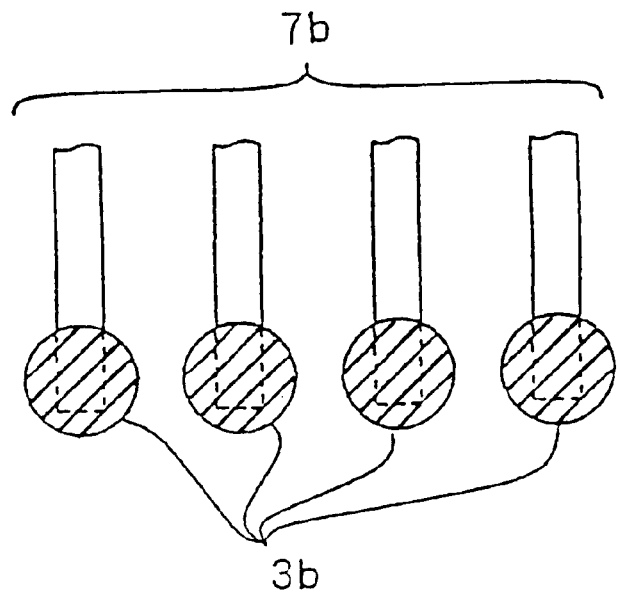
FIG. 8 is a plan view showing a modification of a conductive section of a sealing member.

In the above first embodiment, the conductive sections 3b of the sealing member 3 are formed in a state of being jointed to the tips of a plurality of second electrodes 7b formed on the second substrate base material 12b, as shown in FIG. 7. Instead of such long conductive sections 3b stretching over a plurality of electrodes, the conductive sections 3b may also be formed in a dotted state in correspondence with each of the second electrodes 7b, as shown in FIG. 8.

Figure 9:
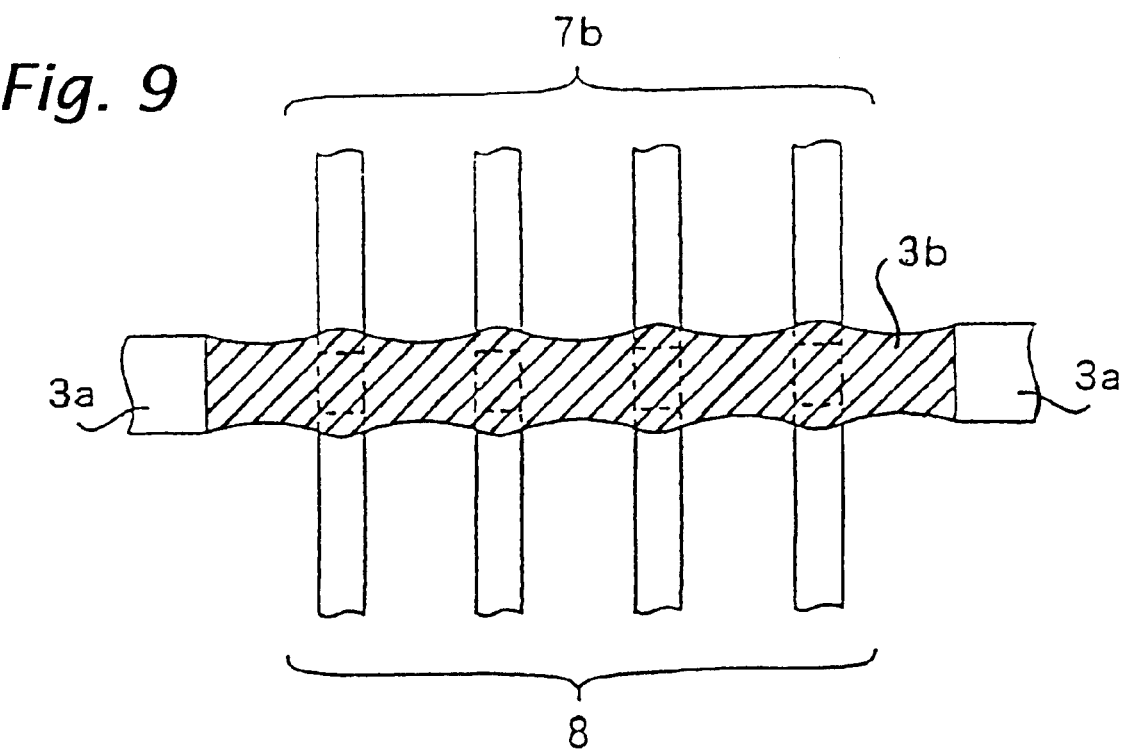
FIG. 9 is a plan view showing a sealing member and the vicinity thereof when conductive sections of the sealing member shown in FIG. 8 are used.

These conductive sections 3b spread in a lateral direction to be jointed to each other, as shown in FIG. 9, when the substrate base material 12a (see FIG. 6) and the substrate base material 12b (see FIG. 7) are secured to each other, whereby the annular sealing member 3 without any clearance is formed. In the case of the previous embodiment shown in FIG. 7, that is, in the case where the conductive section 3b is formed being jointed to each other across a plurality of electrodes, the sealing member 3 may solidify between adjacent electrodes, resulting in a short circuit caused between the electrodes. In contrast, according to the embodiment shown in FIG. 8, the sealing member 3 scarcely solidifies between adjacent electrodes 7b.

(Third Embodiment)

Figure 10:
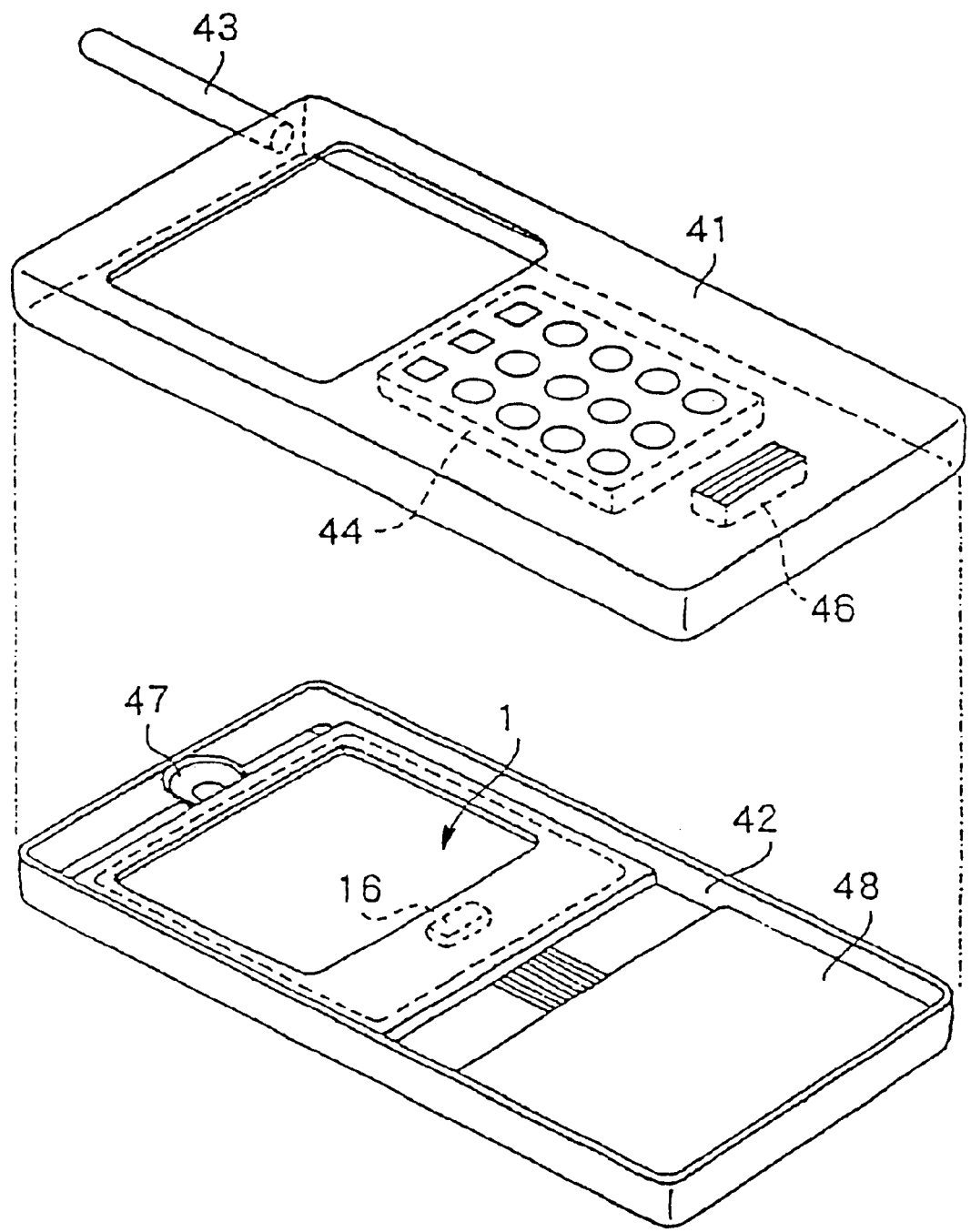
FIG. 10 is an exploded perspective view showing an embodiment of an electronic apparatus according to the present invention.

FIG. 10 shows an embodiment of an electronic apparatus according to the present invention. In this embodiment, the liquid crystal device according to the present invention is applied to a mobile phone as an electronic apparatus. The mobile phone shown herein includes an upper casing 41 and a lower casing 42. The upper casing 41 is provided with a transmitting/receiving antenna 43, a keyboard unit 44, and a microphone 46. The lower casing 42 is provided with, for example, the liquid crystal device 1 shown in FIG. 4, a speaker 47, and a circuit board 48. A liquid crystal-driving IC 16 is jointed to the liquid crystal device 1.

Figure 11:
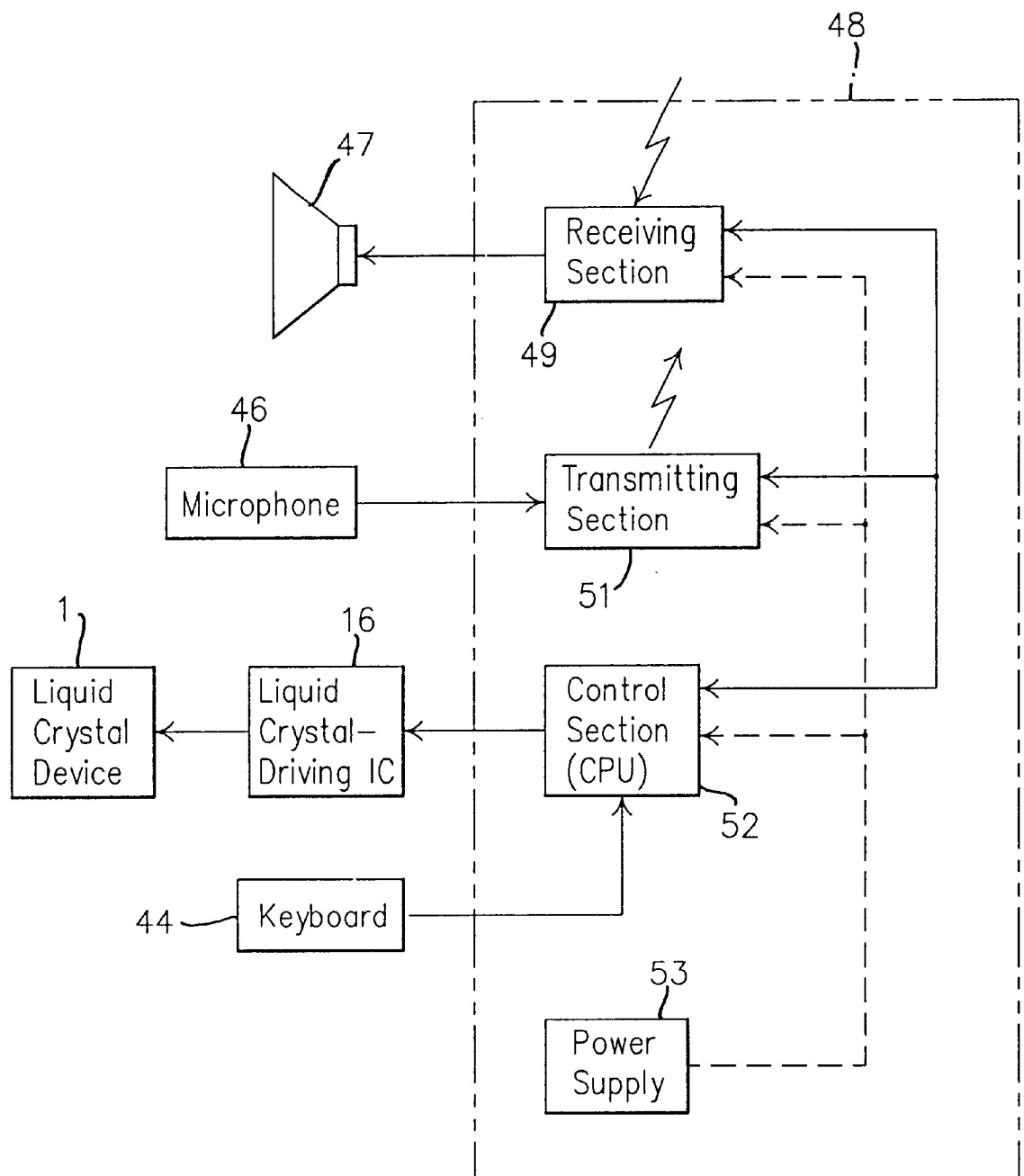
FIG. 11 is a block diagram showing an example of an electric control system for use in the electronic apparatus of FIG. 10.
Figure 12:
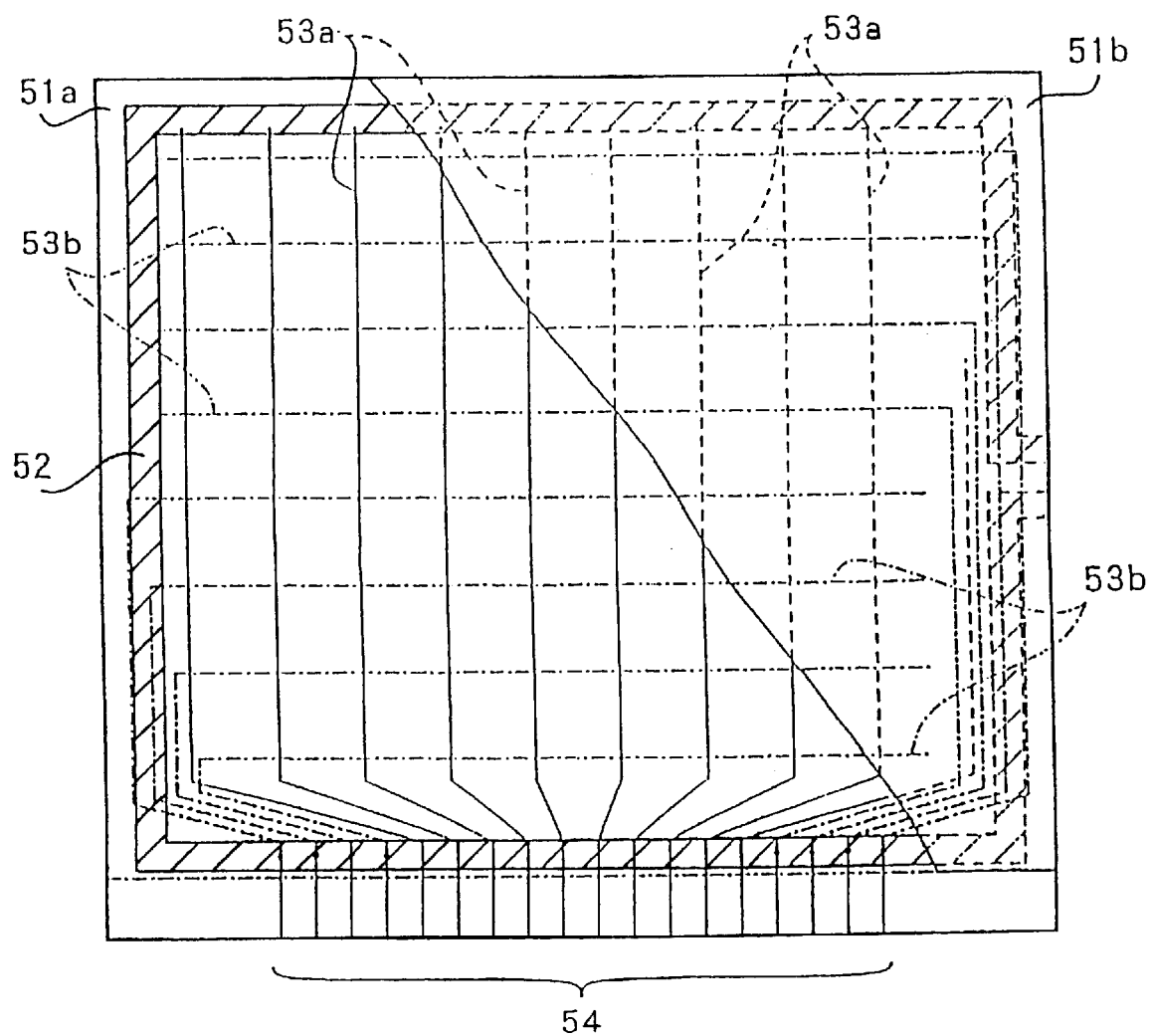
FIG. 12 is a partially cutaway plan view showing an example of a conventional liquid crystal device.
Figure 13:
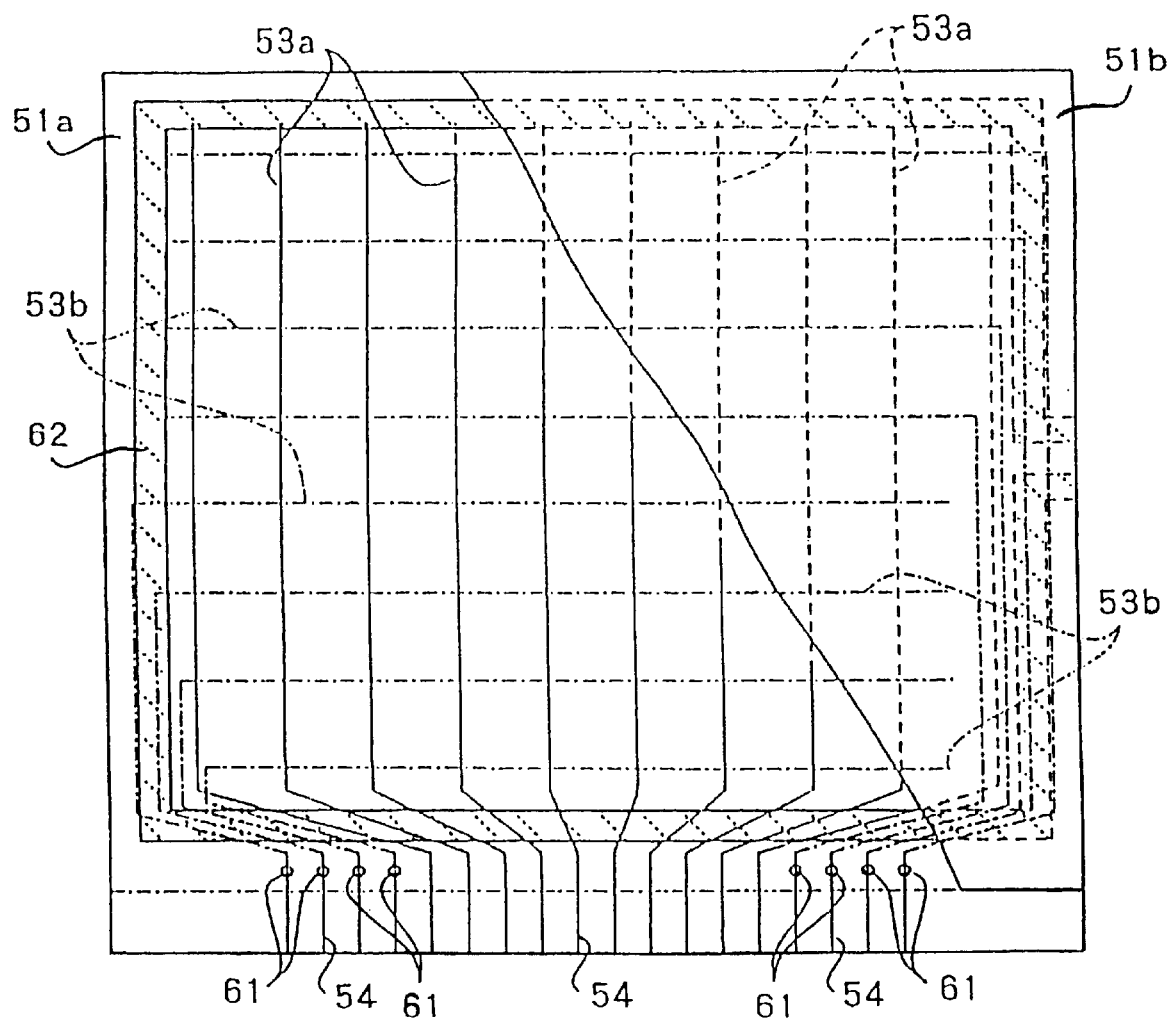
FIG. 13 is a partially cutaway plan view showing another example of the conventional liquid crystal device.

On the circuit board 48, as shown in FIG. 11, there are provided a receiving section 49 jointed to an input terminal of the speaker 47, a transmitting section 51 jointed to an output terminal of the microphone 46, a control section 52 including a CPU, and a power supply 53 for supplying electric power to each of the sections. The control section 52 reads states of the transmitting section 51 and the receiving section 49, and supplies information to the liquid crystal-driving IC 16 based on the result thereof to display visible information, such as letters and numeric characters, on a display area of the liquid crystal device 1. The control section 52 also supplies information to the liquid crystal-driving IC 16 based on the information output from the keyboard unit 44 to display visible information on the display area of the liquid crystal device 1.

(Other Embodiments)

While the present invention has been described with reference to the preferred embodiments, the present invention is not limited to the embodiments, but can be variously modified within the scope of the invention as defined in the claims.

For example, according to the above manufacturing method for the liquid crystal device described with reference to FIGS. 5 to 7, the non-conductive sections 3a of the sealing member 3 are formed on the first substrate base material 12a, and the conductive sections 3b of the sealing member 3 are formed on the second substrate base material 12b opposing the first substrate base material 12a. Conversely, however, the conductive sections 3b may be formed on the first substrate base material 12a, and the non-conductive sections 3a may be formed on the second substrate base material 12b.

In addition, the above manufacturing method for the liquid crystal device described with reference to FIGS. 5 to 7 is an example of a manufacturing method for the liquid crystal device according to the present invention, and the liquid crystal device according to the present invention can be made by a manufacturing method other than the above manufacturing method.

INDUSTRIAL APPLICABILITY

As described above, according to the liquid crystal device, the method for manufacturing a liquid crystal device, and the electronic apparatus of the present invention, the sealing member is divided into two sections: a conductive section and the non-conductive section, and the second electrodes on the second substrates and the external terminals on the first substrate are subjected to conductive connection via the conductive section. This feature eliminates the necessity for preparing a special conductive member in addition to the sealing member and consequently, the outer dimensions as the liquid crystal device can be reduced with the present effective display area secured, so that this is useful for a liquid crystal device and an electronic apparatus having the liquid crystal device mounted thereon. In other words, since a wider effective display area can be obtained from the present outer dimensions of the liquid crystal device, this is suitable for a liquid crystal device and an electronic apparatus having the liquid crystal device mounted thereon. In addition, since the section of the sealing member other than the conductive section is the non-conductive section, a complicated electrode pattern including cross wiring and the like can be formed over a wide region of the liquid crystal device, and this is advantageous to a liquid crystal device.

What is claimed is:

1. A method for manufacturing a liquid crystal device comprising:
providing a first substrate having a plurality of first electrodes and a plurality of external terminals;
providing a second substrate having a plurality of second electrodes such that the second electrodes oppose said first electrodes; and joining said first substrate and said second substrate to each other with an annular sealing member, wherein said joining step includes forming a conductive section of the sealing member on one of said first substrate and said second substrate, forming a non-conductive section of the sealing member on the other one of said first substrate and said second substrate, and securing said first substrate and said second substrate to each other so that said conductive section and said non-conductive section are joined to form the annular sealing member.

2. A method for manufacturing a liquid crystal device as claimed in claim 1, further comprising:

providing the conductive section of said sealing member continuously across the plurality of external terminals on the first substrate or across the plurality of second electrodes on the second substrate.

3. A method for manufacturing a liquid crystal device as claimed in claim 1, further comprising:

providing the conductive section of said sealing member in a dotted state in correspondence with each of the plurality of external terminals formed on the first substrate or in correspondence with each of the plurality of second electrodes formed on the second substrate.

4. A liquid crystal device comprising:

a first substrate;

a plurality of first electrodes formed on said first substrate;

a plurality of external terminals formed on said first substrate, said external terminals being connected to said first electrodes;

a second substrate opposed to said first substrate;

a plurality of second electrodes formed on said second substrate; and an annular sealing member disposed between said first substrate and said second substrate, said sealing member including conductive sections, said second electrodes and said external terminals being conductively connected to each other by said conductive sections;

wherein the conductive sections of said sealing member are provided intermittently in correspondence with each of the plurality of external terminals and second electrodes.

5. The liquid crystal device as claimed in claim 4, wherein said external terminals are connected to an external circuit for supplying a voltage thereto.

6. The liquid crystal device as claimed in claim 4 wherein said conductive sections include an electrically insulating adhesive agent and conductive particles mixed therein.

7. A liquid crystal device comprising:

a first substrate;

a plurality of first electrodes formed on said first substrate;

a plurality of external terminals formed on said first substrate, said external terminals being connected to said first electrodes;

a second substrate opposed to said first substrate;

a plurality of second electrodes formed on said second substrate; and an annular sealing member disposed between said first substrate and said second substrate, said sealing member including conductive sections, said second electrodes and said external terminals being conductively connected to each other by said conductive sections;

wherein said external terminals include a first set of terminals and a second set of terminals, said second set of terminals being positioned between a first and second group of said first set of terminals, said sealing member including a non-conductive section provided in correspondence with said second set of terminals.

8. A method for manufacturing a liquid crystal device comprising:

disposing a first sealing member on a first substrate, said first substrate having first electrodes, first external terminals connected with said first electrodes, and second external terminals;

disposing a second sealing member on a second substrate, said second substrate having second electrodes; and securing said first substrate and second substrate to each other so that said first sealing member and said second sealing member are joined so as to form an annular sealing member;

said first sealing member having conductivity and being disposed so that said second external terminals and second electrodes are electrically connected to each other.

9. A method for manufacturing a liquid crystal device as claimed in claim 8 wherein said second sealing member is non-conductive.

10. A method for manufacturing a liquid crystal device as claimed in claim 8 wherein said first sealing member includes an electrically insulating adhesive agent and conductive particles mixed therein.

11. A method for manufacturing a liquid crystal device as claimed in claim 8 wherein in that said second sealing member includes an electrically insulating adhesive agent and conductive particles mixed therein.

12. A method for manufacturing a liquid crystal device comprising:

disposing a first sealing member on a first substrate, said first substrate having first eletrodes, first external terminals connected with said first electrodes and second external terminals;

disposing a second sealing member on a second substrate, said second substrate having second electrodes; and securing said first substrate and second substrate to each other so that said first sealing member and said second sealing member are joined so as to form an annular sealing member;

said second sealing member having conductivity and being disposed so that said second external terminals and second electrodes are electrically connected to each other.

13. A method for manufacturing a liquid crystal device as claimed in claim 12 wherein said first sealing member is non-conductive.

* * * * *